United States Patent [19]
Owicki et al.

[11] Patent Number: 5,446,901
[45] Date of Patent: Aug. 29, 1995

[54] FAULT TOLERANT DISTRIBUTED GARBAGE COLLECTION SYSTEM AND METHOD FOR COLLECTING NETWORK OBJECTS

[75] Inventors: Susan S. Owicki, Palo Alto; Andrew D. Birrell, Los Altos; Charles G. Nelson, Palo Alto; Edward P. Wobber, Menlo Park, all of Calif.

[73] Assignee: Digital Equipment Corporation, Maynard, Mass.

[21] Appl. No.: 85,407

[22] Filed: Jun. 30, 1993

[51] Int. Cl.⁶ .............................................. G06F 12/00
[52] U.S. Cl. .............................. 395/700; 364/DIG. 1; 364/228.7; 364/228.8; 364/280; 364/281.1; 364/284; 364/284.3; 364/284.4; 395/650
[58] Field of Search .................... 395/650, 700; 364/228.7, 228.8, 280, 281.1, 284, 284.3, 284.4

[56] References Cited

U.S. PATENT DOCUMENTS

| | | | |
|---|---|---|---|
| 4,525,708 | 6/1985 | Bratt et al. | 364/DIG. 1 |
| 4,853,842 | 8/1989 | Thatte et al. | 364/DIG. 1 |
| 4,907,151 | 3/1990 | Bartlett | 364/DIG. 1 |
| 4,912,629 | 3/1990 | Schuler, Jr. | 364/DIG. 1 |
| 4,961,137 | 10/1990 | Augusteijn et al. | 364/DIG. 1 |
| 4,989,132 | 1/1991 | Mellender et al. | 364/DIG. 1 |
| 5,088,036 | 2/1992 | Ellis et al. | 395/425 |
| 5,295,256 | 3/1994 | Bapat | 395/500 |

OTHER PUBLICATIONS

Ahmed, et al.; "A comparison of object-oriented database management systems for engineering applications", MIT, 1990.

Chou, et al.; "Design and Implementation of the Wisconsin Storage System"; U. of Wisc.; 1983.

Deux, et al.; "The O₂ System"; O₂ Technology; Cedex, France.

Employees of Versant Object Technology; "Versant ODBMS", Versant Object Technology; Menlo Park, Calif.; 1992.

Hurson et al.; "Object-oriented database management systems: evolution & performance issues"; IBM; 1993.

Kim et al.; "Composite Object Support in an Object-Oriented Database System"; Microelectronics & Computer Tech. Corp.; Austin, Tex., 1987.

Kim, et al., "Integrating an object-oriented programming system with a database system"; Microelectronics & of Computer Tech. Corp. (Austin, Tex.) and Unisys Corp. (St. Paul, Minn.); 1988.

Kim, et al.; "Operations & Implementation of Complex
(List continued on next page.)

*Primary Examiner*—Thomas M. Heckler
*Assistant Examiner*—Jonathan Hall Backenstose
*Attorney, Agent, or Firm*—Arthur W. Fisher; Barry N. Young

[57] ABSTRACT

A distributed computer system includes a multiplicity of concurrently active processes. Each object is owned by one process. Objects are accessible to processes other than the object's owner. Each process, when it receives a handle to an object owned by any other process, sends a first "dirty" message to the object's owner indicating that the object is in use. When a process permanently ceases use of an object handle, it sends a second "clean" message to the object's owner indicating that the object is no longer in use. Each object's owner receives the first and second messages concerning usage of that object, stores data for keeping track of which other processes have a handle to that object and sends acknowledgement messages in return. The receiver of an object handle does not use the handle until its first message is acknowledged. Periodically, the object's owner sends status request messages to other processes with outstanding handles to that object to determine if any of those processes have terminated and updates its stored object usage data accordingly. A garbage collection process collects objects for which the usage data indicates that no process has a handle. The first and second messages include sequence numbers, wherein the sequence numbers sent by any process change in value monotonically in accordance with when the message is sent. Object owners ignore any message whose sequence number indicates that it was sent earlier than another message for the same object that previously received from the same process.

9 Claims, 3 Drawing Sheets

FAULT TOLERANT DISTRIBUTED GARBAGE COLLECTION SYSTEM AND METHOD FOR COLLECTING NETWORK OBJECTS

The present invention relates generally to distributed computer systems in which multiple processes can access network objects, and particularly to a system and method for garbage collecting network objects reliably and efficiently despite the possibility of network communication failures and failures of client processes with outstanding handles to network objects.

BACKGROUND OF THE INVENTION

Garbage collection is the process of deallocating storage of objects, or other data structures, that are no longer referenced by or accessible to any process. The goal of garbage collection is to return memory storage currently allocated to inaccessible objects to the pool of memory available for allocation to new objects.

An object consists of a data record and a set of methods or operations that can be invoked on the object. A network object, sometimes herein called a shared object, is an object than can be shared by processes in a distributed computer system. It is generally required that the memory allocated to an object in its owner's address space be retained as long as any process in the distributed system has a handle for that object.

Garbage collection in distributed computer systems is valuable for the same reasons that apply to garbage collection programs that run in a single address space. However, the types of failures that can occur in a distributed computer system make garbage collection of network objects much more difficult. For instance, it is important that an object's memory remain allocated as long as any process has a handle for it. Conversely it is important that memory be reclaimed when there are no more handles to the object anywhere in the system, even if an objects handle was eliminated by the termination of a process. Unfortunately, processes that terminate, normally or abnormally, cannot be expected to reliably notify the owners of all network objects for which those processes have object handles. The present invention provides a mechanism by which an object's owner can determine which processes that had handles to the object have terminated. Another problem that can make garbage collection of network objects difficult is that communication problems can prevent successful transmission of a "handle deleted" message by a process to the object's owner.

For the purposes of this document, a "client" is any process other than the owner of an object that receives a handle for the object. An object "handle" is an object identifier or set of information that allows a process to invoke operations on the object. Those operations are usually performed by the owner process, and thus the owner acts as a server process when operations are invoked on the object(s) that it owns.

Important properties that any distributed garbage collector should have are as follows:

1) The garbage collector should guarantee that an object will not be collected while any process has a handle for it. The one exception is that a long-lasting communication failure may be misinterpreted as a process failure. If communication is later restored and the process with the handle tries to use the handle after the object has been collected, that process must be notified of the error.

2) Storage allocated to an object must be reclaimed when no process holds a handle to it, or if the only processes holding such handles have failed. This is essential to prevent resources from being tied up in long-running servers.

3) An object's handle should be freely transferrable among processes. In particular, a handle can be sent from one client to another, and not just from the object's owner to a client.

4) The garbage collector should not require global synchronization of processes, which would be impractical in large distributed systems.

5) The garbage collector should be efficient in its use of system resources.

6) The operation of the garbage collector should be transparent to the users of the system.

SUMMARY OF THE INVENTION

In summary, the present invention is used in a distributed computer system having a multiplicity of concurrently active processes that share objects. Each object is owned by one process. Objects are accessible to processes other than the objects owner though the use of object handles.

Each process, when it receives a handle to an object owned by any other process, sends a first "dirty" message to the object's owner indicating that the object is in use. When a process permanently ceases use of an object handle, it sends a second "clean" message to the object's owner indicating that the object is no longer in use. Each object's owner receives the first and second messages concerning usage of that object, sends acknowledgement messages in response, and stores corresponding data for keeping track of which other processes have a handle to that object. Periodically, the object's owner sends status request messages to other processes with outstanding handles to that object to determine if any of those processes have terminated and then updates its stored object usage data accordingly. When the last client of an object releases its handle to the object and sends a clean message to the object's owner (or has its failure detected), the object's owner makes the object available for collection by the process's standard garbage collection procedure. That garbage collection procedure collects objects for there are no outstanding references in the process.

The receiver of an object handle does not use the handle until its first message is acknowledged. Furthermore, the receiver of an object handle does not acknowledge receipt of that handle until the object owner acknowledges receipt of its first "dirty" message. This interlocking procedure is used to ensure that the process that provided the object handle does not delete and "de-register" the only outstanding handle to the object before the receiver of the handle is able to register its copy of the object handle with the object owner. In other words, the interlocking procedure is used to prevent the possibility that the shared object will be garbage collected before the receiver of the object handle has an opportunity to invoke or otherwise use the shared object.

The first and second messages include sequence numbers, wherein the sequence numbers sent by any process change in value monotonically in accordance with when the message is generated. Object owners ignore any message whose sequence number indicates that it was generated earlier than another message previously received from the same process concerning the same object.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
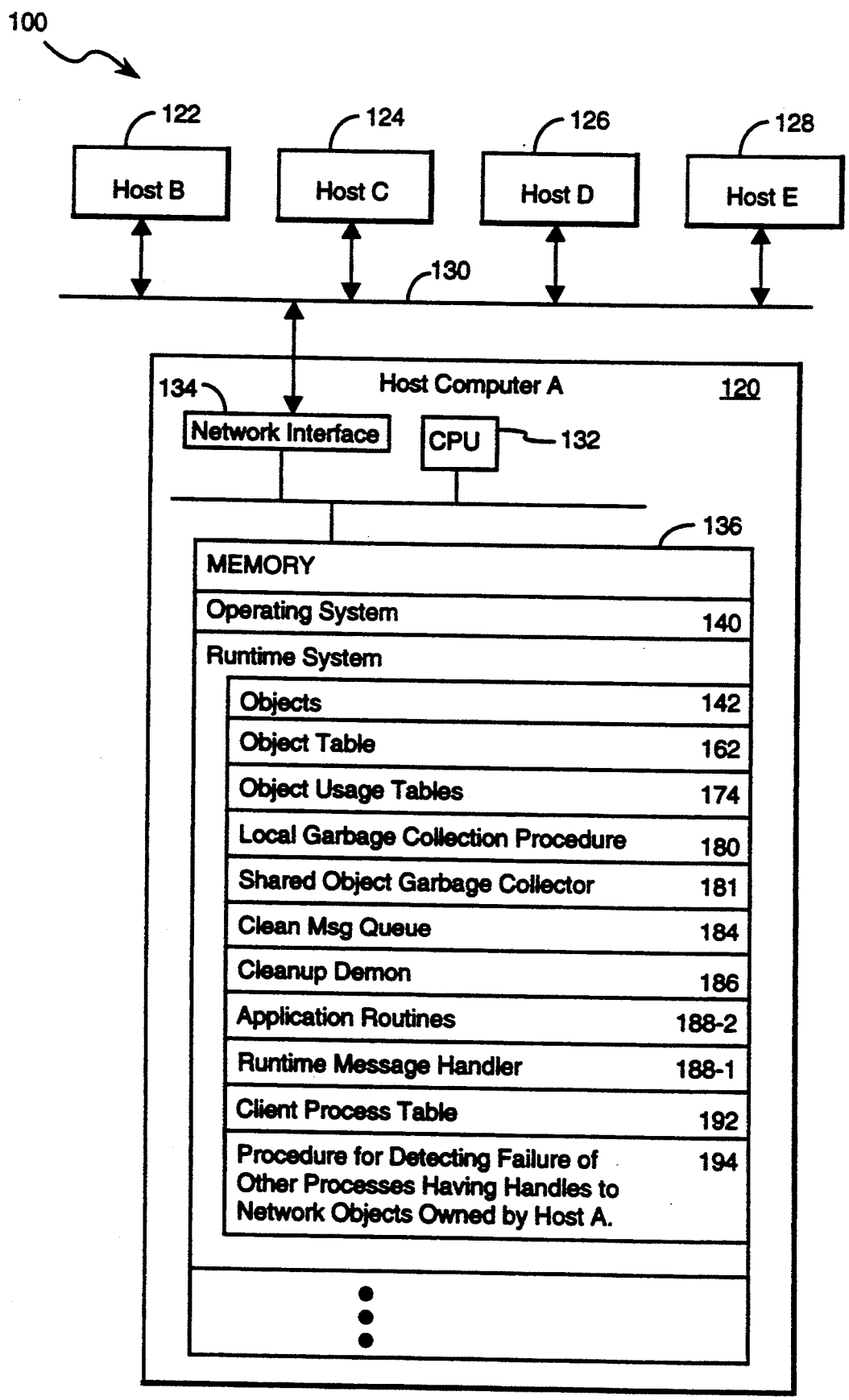
FIG. 1 is a block diagram of a distributed computer system in which the host computers incorporate the present invention.

Referring to FIG. 1, there is shown a distributed computer system 100 having several host computers 122, 124, 126, and 128 interconnected by a local area or wide area network 130. Each host computer has a CPU 132, a network interface 134 for handling the transmission and reception of messages over the network 130, and a computer memory 136 which includes both high speed random access memory and secondary (e.g., disk) memory.

The host computers in the system 100 will all utilize a common operating system 140, such as Unix or Windows NT. Objects 142 are stored in memory on behalf of the processes running on each host computer. Objects are data structures that include both a data record and a set of methods or operations that can be invoked on the object. A network object, sometimes herein called a "shared object", is an object than can be shared by processes in the distributed computer system.

The owner of an object is herein called a "server process" with respect to calls made on that object by other processes, and processes other than the owner are herein called "client processes". Thus, a process will be called a server process with respect to the objects that it owns and will be called a client process with respect to objects owned by other processes. Therefore it is possible for a process to be both a client and a server process with respect to different objects. However, in many distributed computer systems certain processes will be set up on high speed host computers as server processes and in such systems many processes will be primarily client processes and other processes will be primarily server processes.

It should be noted that while this document will talk about "sending messages" between various processes, in the preferred embodiment most inter-process communications are performed as remote procedure calls (RPCs). For instance, a client process will make an initial remote procedure call to an object in a server process in order to register itself as a user of the object and to obtain sufficient information to set up a surrogate object (which is an expanded version of a handle to the called object) for making further calls to that object. The remote procedure call and the server's response thereto are "messages" transported between the client and server processes.

Another general point concerning communications between processes is that the present invention is applicable even if all the processes in the system reside on a single host computer. Each process has its own distinct address space, regardless of which host computer it is located on, and thus inter-process communications are required for sharing objects regardless of which host computers those processes are located on. What makes garbage collection of objects shared by more than one process difficult is not that objects can be stored on different host computers, but rather the problems associated with process failures and problems related to determining when no process still has a handle to an object. Clearly, communication failures between processes am more likely in a distributed computer system than a single host computer system, but only a few aspects of the present invention are related to handling long lasting communication failures.

Figure 2:
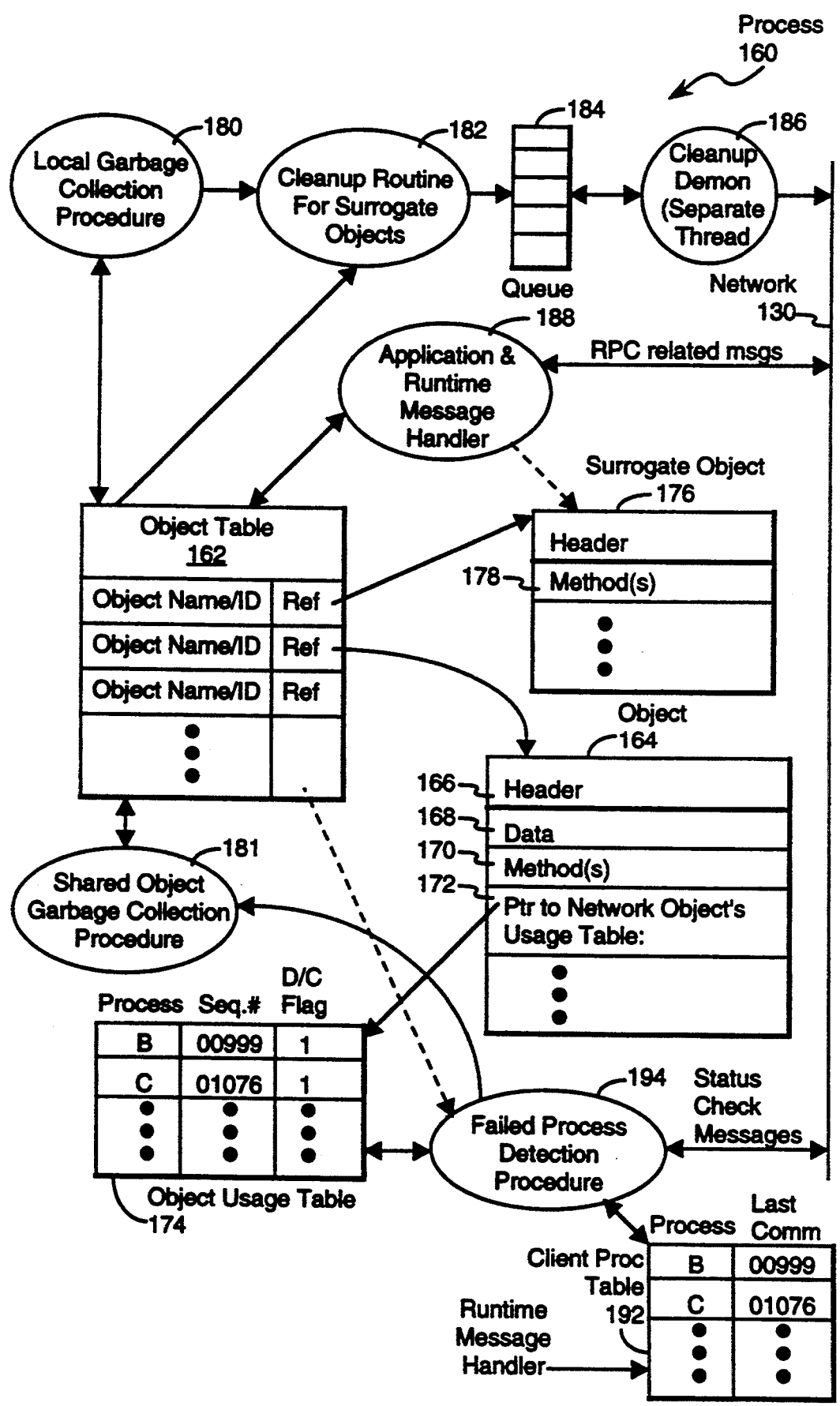
FIG. 2 is a block diagram of one process which incorporates the present invention.

Referring to FIG. 2, we will now consider the data structures and procedures associated with any one process 160 for implementing the present invention. All other processes in the computer system will have substantially identical data structures and procedures. Each process has an object table 162 for referencing network objects such as object 164 that are owned by the process 160. In particular, any network object owned by the process and accessible by other processes, as well as any surrogate objects used for invoking objects owned by other processes must be listed in the process's object table 162.

Each network object 164 includes a standard object header 166, a data record 168, a set of methods or procedures 170 that can be invoked though calls to the object 164, and a pointer 172 to an object usage table 174. In some implementations of the present invention the pointer 172 may be located in the object's header. In other implementations of the present invention, a single usage table is used for all shared objects owned by a process 160, in which case each entry in the usage table includes an additional field for denoting the shared object to which that entry applies. For the purposes of this document, in such embodiments of the present invention any reference to the "usage table" for a particular object shall be understood to mean the set of entries in the usage table for that object.

As will be discussed in more detail below, a process creates a surrogate object after it receives an object handle to an object for which it does not already have a surrogate object. Each surrogate object 176 contains a set of methods or procedures 178 for invoking the corresponding object stored in the address space of its owner's process. For the purposes of this document, a "surrogate object" shall be considered to be a type of object handle, and an "object handle" shall be considered to be another (simpler) type of object handle.

Each process has its own local garbage collection procedure 180 for collecting inaccessible objects. Almost any known local garbage collection procedure can be used so long as that garbage collection procedure treats the pointers to network objects in the object table 162 as references to objects in the process address space. Thus, the local garbage collection procedure 180 could use either a "mark and copy" or a "reference counting" garbage collection methodology. In either case, any shared (network) object owned by the process which is listed in the object table 162, and thus has a pointer to it in the object table 162, must not be collected (i.e., its allocated memory space must not be deallocated) by the local garbage collection procedure 180.

A shared object is collected by the local garbage collection procedure 180 only after a separate "shared object garbage collector" 181, which will be discussed below, removes the shared object from the object table 162. On the other hand, a surrogate object listed in the object table 162 can be collected by the local garbage collection procedure 180 if there is no path to the surrogate object in the process other than through the object table 162. However, upon collecting the surrogate object 176, the local garbage collector 180 must initiate a cleanup procedure 182 for sending a "clean" message to the object's owner so that the object owner is notified that the surrogate object 176 has been collected. Thus, the local object garbage collection procedure 180 will need to be modified (A) not to treat pointers to surrogate objects in the object table 162 as the type of object references which prevent object collection, and (B) to call the cleanup procedure 182 whenever a surrogate object is collected.

OBJECT USAGE TABLE

Each shared object 164 owned by process 160 must have an object usage table 174 for storing data regarding the other processes that have handles for accessing the object 164. Use of the object usage table 174 is easiest to understand by considering an example.

Figure 3:
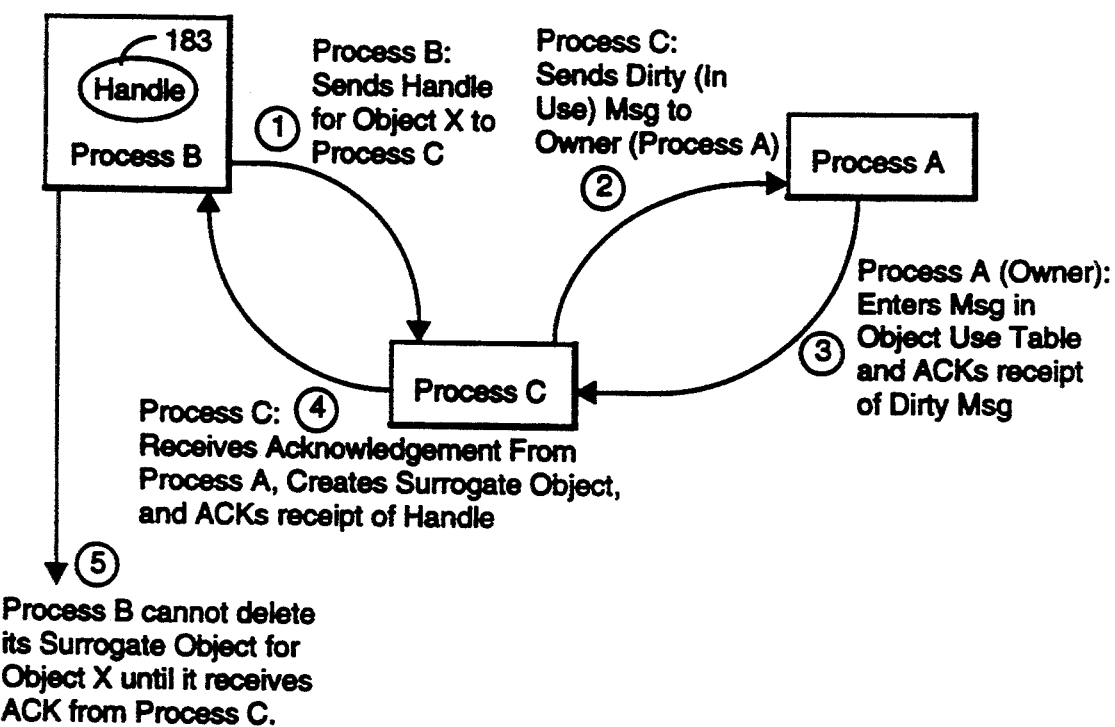
FIG. 3 schematically depicts a sequence of messages associated with sending an object handle to a process.

It is generally required that the memory allocated to an object in its owner address space be retained as long as any process in the distributed system has a handle for that object. The main time that this principle is difficult to adhere to is when a handle to an object is first sent to a process by another process. FIG. 3 shows a sequence of interlocking actions that must be performed in accordance with the present invention in order to ensure that the object corresponding to the handle is not garbage collected before the process that receives the handle has an opportunity to register itself with the object.

Table 1 contains a pseudocode representation of the procedures performed by the three processes shown in FIG. 3. The pseudocode used in this document is, essentially, a computer language using universal computer language conventions. While the pseudocode employed here has been invented solely for the purposes of this description, it is designed to be easily understandable by any computer programmer skilled in the art.

Referring to FIG. 3, it is assumed that Process B already has possession of a handle 183 or surrogate object to object 164 in Process A. In addition, Process B must keep a pointer to that surrogate object, so as to ensure that the surrogate object will not be garbage collected, until the fourth step of the procedure in FIG. 3 is completed. A handle to an object is simply an object identifier having sufficient information to make an initial remote procedure call to the corresponding object. On the other hand, a surrogate object is an object having a set of object-specific procedures for making remote procedure calls to invoke the object's internal procedures. The information in a surrogate object enables the process that owns the surrogate object to make an object handle that can be transmitted to any other process in the system. In the preferred embodiment of the present invention, an object handle can be freely transmitted by a process to other processes.

The sequence of events depicted by FIG. 3 is indicated by circled event numbers I through 5. In the first step in the sequence of events depicted by FIG. 3, Process B sends to Process C a handle to an Object X (e.g., object 164) that is owned by Process A. For instance, Process B might send the handle to Process C in response to a request by Process B or as part of a "broadcast" distribution of a handle to an updated version of Object X.

In the second step depicted by FIG. 3, Process C uses the object handle to send a "dirty" message to the corresponding object's owner, Process A. More particularly, Process C would first check its own object table to see if it already has a surrogate object corresponding to the received object handle. If it already has such a surrogate object, then Process C already has the ability to make remote procedure calls to the shared object corresponding to the received object handle, and therefore Process C would simply not take any further action with regard to the received object handle.

Assuming that Process C does not already have a surrogate object corresponding to the received object handle, Process C then makes an initial remote procedure call to Process A using the object handle to supply an object identifier. The initial remote procedure call is interpreted by Process A as a "dirty" message, which might alternately be considered to be an "in use" message or a request to register Process C as a client of the object. The remote procedure call by Process C to Process A includes a sequence number generated by Process C. The sequence numbers generated by any process must increase (or change monotonically in value) with each new message generated by that process. Thus, the sequence numbers generated by each process are functionally equivalent to timestamps.

In the third step depicted in FIG. 3, Process A, the owner of the object being called, receives the remote procedure call from Process C. Process A looks at the called object's usage table 174 (FIG. 2) to see if the table already has an entry for Process C, and if so it checks to see if the sequence number for that entry indicates that the received message was generated later than any previously received message from Process C. For the purposes of this example we will assume that the called object's usage table does not already contain an entry for Process C. In that case, Process A makes an entry into the called objects usage table. The entry stored in the table by Process A includes information identifying Process C as a client, the sequence number attached to the remote procedure call, and an "in use" flag (sometimes herein called a "dirty" flag) indicating that Process C has declared that it has a handle to the object.

In the third step depicted by FIG. 3, Process A also sends an acknowledgement message back to Process C, acknowledging the remote procedure call from Process A. In the preferred embodiment, the return message from Process A also includes the information needed by Process C to generate a surrogate object for invoking the methods or procedures in the object referenced by the object handle. In particular, the first remote procedure call to Process A invokes a procedure in the called object for exporting all the procedures necessary to make remote procedure calls to the object for the purpose of performing a defined task or set of tasks.

In the fourth step depicted in FIG. 3, Process C receives the acknowledgement from Process A, creates a surrogate object for making future calls to the object in Process A, and sends a message to Process B acknowledging receipt of the object handle from Process B. Thus, the acknowledgment sent by Process C to Process B is delayed until Process C is able to register itself with the object owner, Process A.

Finally, in the fifth step depicted in FIG. 3, Process B can now delete its own surrogate object corresponding to the object handle it sent to Process C. In other words, if the application in Process B that sent the handle to Process C is programmed to delete the corresponding surrogate object in Process B, that deletion must be delayed until Process B receives the acknowledgement message from process C. This ensures that at least one active entry will remain in the object usage table for the object corresponding to handle, which in turn will ensure that the object will not be garbage collected before Process C gets a change to register itself as a user of the object.

When the process that is sending the handle to Process C is the owner of the object (i.e., when Process B is the same process as Process A), the object owner must place a "placeholder" entry in the object usage table 174 of the object before sending the object handle to Process C. The placeholder entry will indicate to the garbage collector that at least one process (i.e., the object owner, in this case) holds a handle to the corresponding object, and that therefore the object cannot be collected.

TABLE 1

Pseudocode Procedures Corresponding to FIG. 3

Pseudocode for Process B:

Retain a pointer to Surrogate Object X — i.e., to the Surrogate for Object X — this ensures that Surrogate Object X will not collected
Send handle for Object X to Process C
Wait for acknowledgement from Process C
Upon receiving acknowledgement, pointer to Surrogate Object X need not be retained (i.e., normal operation of Process B with respect to the retained pointer to the Surrogate Object X resumes)

Pseudocode for Process C:

Receive handle for Object X
If Process C does not already have a Surrogate Object X
{
   Generate new Sequence#
   Send Remote Procedure Call (Dirty, Handle for
   Object X, Sequence#) to Process A
   Wait for Acknowledgement from Process A
   Upon receiving Acknowledgement, generate Surrogate
   Object X using information received in the
   acknowledgement message
   Send Acknowledgement message to Process B
}

Pseudocode for Process A:

Receive Remote Procedure Call from Process C having "dirty" message therein. Look in Object Usage Table for Object X for any entry referencing Process C. If an entry referencing Process C is found
{
   If Sequence# in the received Remote Procedure
   Call is less than the sequence# stored in the
   located entry in the Object Usage Table
   {
      Do not change Object Usage Table for Object X
   }
   Else
   {
      Store received Sequence# in located entry
      Mark located entry as "in use"
   }
}
Else — no entry for Process C is present in Usage Table
{
   Store a new entry in Object Usage Table for Object X
   denoting Process C, the received Sequence#, with
   "in use" flag set.
}
Send Acknowledgement message to Process C with information needed to generate a Surrogate object.

PROCESSING RELEASED OBJECT HANDLES

In the preferred embodiment of the present invention, an object handle is deemed to have been released by a process when the corresponding surrogate object is deallocated by a local garbage collector. Referring to FIG. 2, when a process garbage collects a surrogate object 176 through the action of its local garbage collector 180, it deallocates the memory used by the surrogate object, replaces the reference pointer in the object table 162 with a null value, and calls cleanup procedure 182. Cleanup procedure 182 puts a "clean message" on a queue 184, where the clean message stored in the queue 184 indicates the process to which it is to be sent and the object which is the target of the "clean message". A sequence number is assigned to the clean message at the time the message is put on the queue 184. As mentioned earlier, the sequence numbers generated by any process must increase (or change monotonically in value) with each new message generated by that process.

A cleanup demon 186 is a procedure that periodically sends the "clean messages" stored in the queue 184 to the respective object owners corresponding to the collected surrogate objects. The cleanup demon 186 is required to repeatedly send each clean message until either the object owner acknowledges the clean message, or the computer system notifies the cleanup demon 186 that the message cannot be delivered because the object owner process has terminated.

In the preferred embodiment, the cleanup demon 186 is a separate thread of execution that runs in the same process address space as the application routines 188, local garbage collector 180 and so on. Placing the "clean message" transmission procedure in a separate thread assures that the cleanup procedure will not block other tasks that the process 160 is programmed to perform.

In the preferred embodiment, the cleanup demon 186 does not explicitly deal with communication failures in the computer system. Rather, it keeps trying to send a clean message until it receives either an acknowledgement or a message that indicates that the object owner process has failed or otherwise terminated (i.e., that it has terminated and will not be recovered). However, the operating system 140 of the host computer or the runtime system of the client process 160 may treat a communication failure of long duration (e.g., of duration more than a predefined threshold of time, such as an hour, or a day, or any other predefined time threshold selected by the persons setting up the distributed computer system) as being equivalent to failure of the process to which a clean message is being sent. As a result, the operating system 140 or the runtime system may inform the cleanup demon 186 that an object owner process has terminated even though the state of the object owner process is actually unknown. Alternately, a time value corresponding to the time each clean message is created could be stored with each clean message in the queue 184, and the cleanup demon 186 could be programmed to assume that the object owner process has terminated if a repeatedly sent clean message is not acknowledged within a threshold period of time after the time value stored with the clean message.

DETECTING PROCESS TERMINATIONS

It is important that memory allocated to shared objects be reclaimed when there are no more handles to the shared object anywhere in the system, even if an object's handle was eliminated by the termination of a process. One type of fault that can interfere with the collection of unreachable shared objects is the failure or termination of a process that had a handle or surrogate object corresponding to the shared object.

Referring to FIG. 2, in accordance with the present invention a shared object cannot be deleted so long as its usage table 174 contains even a single entry having an "in use" (or "dirty") flag that is still set. Unfortunately, processes that terminate, normally or abnormally, cannot be expected to reliably notify the owners of all network objects for which those processes have object handles. In other words, the local garbage collection procedure 180 and cleanup demon 186 of the terminated process may not be able to generate and transmit "clean messages" for all surrogate objects in the process before the process terminates. Therefore, in the present invention, each shared object's owner is provided with a facility for determining which processes that had handles to the shared object have terminated.

In particular, the runtime system's message handler 188-1 in each process 160 maintains a client process table 192 that includes an entry for each client process that has a handle to at least one object owned by the process 160. The entry for each such client process indicates the last time there was a communication received from that client process, and the process's runtime system updates the entries in table 192 every time a communication is received from a client process. Each process 160 also has a failed process detection procedure 194 that monitors the entries in the client process table 192 and sends status check messages to any client process from which there have been no communications for a threshold period of time. If the client process is still alive, and if the communication network between the object owner and the client process is operative, that process will respond with an "I'm still alive" message. In that case, the client process table 192 is updated to indicate the time the message was received from the client process.

If the denoted process has terminated, and if the communication network between the object owner and the host computer on which denoted process was located is operative, the operating system of the host computer on which the denoted process resided will respond to the status request message with a "process terminated" message. In that case, the entry for that process in the client process table 192 is deleted. In addition, the failed process detection procedure 194 will send to the shared object garbage collection procedure 181 a "process failed" message identifying the terminated process. As discussed below, the "process failed" message will cause the shared object garbage collection procedure 181 to search through the usage tables 174 for all shared objects in the process address space and delete all usage table entries for the terminated process.

If no response is received from the client process to which the status request message was sent, for instance due to a communication failure, the status request message is resent up to a predefined number of times over a predefined period of time. If a client process does not respond to any of the status inquiry messages, the failed process detection procedure 194 treats that as being equivalent to a failure of the client process and sends a "process failed" message identifying the client process to the shared object garbage collection procedure 181.

Thus, in the preferred embodiment, the runtime system treats a communication failure of long duration (e.g., of duration more than a predefined threshold of time) as being equivalent to failure of the process to which a status request message is being sent.

SHARED OBJECT GARBAGE COLLECTION

The shared object garbage collection procedure 181 processes "clean" messages received from client processes and "process failed" messages from the failed process detection procedure 194.

When an object owner receives a "clean" message from a client process, it compares the sequence number of the received message with the sequence number stored in the corresponding object's usage table for the process that sent the clean message. If the sequence number indicates that the clean message was created later than any other message concerning the same network object that has been received from that process, the entry for that process in the object usage table is updated by storing a "not in use" flag (also herein called a "clean" flag) value and replacing the stored sequence number with the sequence number received with the clean message. As long other records in the usage table 174 indicate that at least one handle to the shared object is still held by a client process, the usage table entry for the process that has released the object handle is not deleted. Rather the entry is retained so that the most recent sequence number for messages from the corresponding process will be retained (e.g., to protect against "dirty messages" whose transmission was delayed by a communication failure).

However, if the records of the object usage table 174 for the object identified by the received clean message indicate that all client processes have released their handles to the shared object, then the shared object garbage collection procedure 181 deletes the object's usage table 174, and deletes the object's entry in the object table 162. As a result, the shared object is prepared for collection by the local garbage collector 180.

When the shared object garbage collector 181 receives a "process failed" message from the failed process detection procedure 194, which identifies the process that has failed or is presumed to have failed, the shared object garbage collection procedure 181 performs the following steps: (1) it locates each usage table 174 that contains an entry for the identified failed process, and then deletes that entry; and (2) if the usage table 174 of an object has no remaining records, or if the none of the remaining records have an "in use" flag which is set, it deletes that object's usage table 174 and deletes the object's entry in the object table 162. Thus, a "process failed" message is treated like a global "clean" message directed to all shared objects identified in the object table 162.

If another process holds a handle to an object in this process 160 that has been garbage collected, for example due to a long lasting communication failure between the two processes, that other process receives an appropriate error message in response.

As explained above, in the preferred embodiment the shared object garbage collection procedure 181 does not deallocate shared objects, but rather prepares those objects for garbage collection by the local garbage collector 180. Since the owner of a shared object may have pointers to the shared object 164 other than the handles listed in the usage table 174, that object may not be ready for deallocation. Therefore a shared object 164 which no longer has any clients is left in memory (i.e., the object is not deallocated) by the shared object garbage collection procedure 181 for collection by the local garbage collection procedure 180 when the object becomes unreachable to the process 160.

In other embodiments of the present invention in which no local garbage collection procedure 180 is provided, the shared object garbage collection procedure 181 deallocates the memory used by shared objects once all clients of the object release their handles or terminate.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, the use of surrogate objects is not essential to the present invention. Other mechanisms could be used for accessing objects owned by other processes, while still retaining the mechanisms of the present invention for sending a message to an object's owner whenever another process releases a handle to that object. Similarly, the "dirty" and "clean" messages used by the present invention could be sent using standard inter-process message sending mechanisms rather than the remote procedure calls used in the preferred embodiment.

What is claimed is:

1. In a computer system having a multiplicity of concurrently active processes, a method of operating the distributed computer system comprising the steps of:
   storing objects in at least one computer memory, each object being owned by one of said multiplicity of processes;
   for each of a plurality of said objects, distributing handles for accessing said each object to processes other than the process that owns said each object;
   each process further performing the steps of:
      upon receiving a handle to an object owned by any other process, sending a first message to the other process that owns said object, wherein said first message identifies said object and the process which received said handle;
      upon releasing a handle to an object owned by any other process, sending a second message to the process that owns said object, wherein said second message identifies said object and the process which released said handle;
      receiving ones of said first message for objects owned by said each process and storing object usage data indicating which other processes have a handle to each object owned by said each process;
      receiving ones of said second message for objects owned by said each process and deleting corresponding portions of said object usage data;
      sending status request messages to said other processes that said stored object usage data indicates have handles to objects owned by said each process to determine if any of said other processes have terminated, and deleting portions of said object usage data corresponding to those of said other processes determined to have terminated; and
      garbage collecting objects owned by said each process for which said usage data indicates that no process has a handle.

2. The method of claim 1, each process further performing the steps of:
   upon receiving said ones of said first message, sending an acknowledgement of said first message to the process that sent said first message;
   after sanding said first message, waiting to use said received handle until said acknowledgement has been received from the owner of the object corresponding to said received handle.

3. The method of claim 1, wherein
   said steps of sending said first message and sanding said second message include sending a sequence number with each of said first and second messages, wherein said sequence numbers sent by any process change in value monotonically in accordance with when said process sent each corresponding message; and
   said receiving steps including ignoring said received message when said sequence number sent with said received message indicates that it was sent earlier than another message previously received from the same process that sent said received message.

4. A method of operating a computer system, comprising the steps of:
   concurrently running a multiplicity of processes, including a server process and a plurality of client processes; each process running in a distinct address space;
   storing objects owned by the server process in the address space of said server process;
   distributing to ones of said client processes handles for accessing each of a plurality of said objects owned by said server process;
   each client process, upon receiving a handle to an object owned by said server process, sending a first message to said server process, wherein said first message identifies said object and said each client process;
   each client process releases said received handle to said object owned by said server process, and sending a second message to said server process, wherein said second message identifies said object for which said received handle was released and further identifies said client process which released said handle;
   said server process receiving ones of said first message and storing object usage data indicating which client processes have a handle to each object owned by said server process;
   said server process receiving ones of said second message and deleting corresponding portions of said object usage data;
   said server process sending status request messages to those of said client processes that said stored object usage data indicates have handles to objects owned by said client process to determine if any of said client processes have terminated, and deleting portions of said object usage data corresponding to those of said client processes determined to have terminated; and
   said server process garbage collecting objects for which said usage data indicates that no process has a handle.

5. The method of claim 4, further including the steps of:
   said server process, upon receiving each said first message, sending an acknowledgement of said first message to the client process that sent said each first message;
   each client process, after sending said first message, waiting to use said received handle to the object identified in said first message until said acknowledgement has been received from said server process.

6. The method of claim 4, wherein
said steps of sending said first message and sending said second message include sending a sequence number with each of said first and second messages, wherein said sequence numbers sent by any client process change in value monotonically in accordance with when said client process sent each corresponding message; and
said receiving steps including ignoring said received message when said sequence number sent with said received message indicates that it was sent earlier than another message previously received from the same process that sent said received message.

7. A computer system, comprising:
a multiplicity of concurrently active processes;
memory means for storing objects, each object being owned by one of said multiplicity of processes;
handles, held by various ones of said processes, for each of a plurality of said objects, each handle enabling access to a corresponding object by a process other than the process that owns said each object;
each process including:
first message sending means for sending a first message, upon receiving a handle to an object owned by any other process, said first message being sent to the other process that owns said object, wherein said first message identifies said object and the process which received said handle;
second message means for sending a second message, upon releasing a handle to an object owned by any other process, said second message being sent to the process that owns said object, wherein said second message identifies said object and the process which released said handle;
object usage tracking means for receiving ones of said first message for objects owned by said each process and for storing object usage data indicating which other processes have a handle to each object owned by said each process;
said object usage tracking means including means for receiving ones of said second message for objects owned by said each process and deleting corresponding portions of said object usage data;
status checking means for sending status request messages to said other processes that said stored object usage data indicates have handles to objects owned by said each process to determine if any of said other processes have terminated, and for deleting portions of said object usage data corresponding to those of said other processes determined to have terminated; and
garbage collection means for garbage collecting objects owned by said each process for which said usage data indicates that no process has a handle.

8. The computer system of claim 7,
said object usage tracking means including means, responsive to receiving said ones of said first message, for sending an acknowledgement of said first message to the process that sent said first message;
each said process including means for preventing, after sending said first message, use of said received handle until said acknowledgement has been received from the owner of the object corresponding to said received handle.

9. The computer system of claim 7, wherein
said first message sending means and said second message sending means include means for sending a sequence number with each of said first and second messages, wherein said sequence numbers sent by any process change in value monotonically in accordance with when said process sent each corresponding message; and
said object usage tracking means including means for ignoring said received message when said sequence number sent with said received message indicates that it was sent earlier than another message previously received from the same process that sent said received message.

* * * * *

UNITED STATES PATENT AND TRADEMARK OFFICE
CERTIFICATE OF CORRECTION

PATENT NO.    : 5,446,901
DATED         : August 29, 1995
INVENTOR(S)   : Susan S. Owicki et al.

It is certified that error appears in the above-identified patent and that said Letters Patent is hereby corrected as shown below:

Column 12,
Line 6, delete "sanding" and insert -- sending --.

Signed and Sealed this

Thirty-first Day of January, 2006

JON W. DUDAS
*Director of the United States Patent and Trademark Office*